United States Patent
Gauger et al.

[11] Patent Number: 5,316,258
[45] Date of Patent: May 31, 1994

[54] POWER SEAT ADJUSTER WITH DRIVE GEAR FORCE BYPASS

[75] Inventors: Derek K. Gauger, Ann Arbor; Kirk K. Horvet, Royal Oak; Phillip Chaban, Grass Lake, all of Mich.

[73] Assignee: ITT Corporation, New York, N.Y.

[21] Appl. No.: 876,549

[22] Filed: Apr. 30, 1992

[51] Int. Cl.⁵ .................................................. B60N 2/00
[52] U.S. Cl. .............................. 248/548; 74/89.14; 74/89.15; 74/DIG. 10; 248/429; 297/344.1
[58] Field of Search ............... 248/424, 429, 548, 900; 296/68.1; 74/89.14, 89.15, DIG. 10; 297/346

[56] References Cited

U.S. PATENT DOCUMENTS

| | | | |
|---|---|---|---|
| 3,457,234 | 7/1969 | Gianatasio | 74/DIG. 10 X |
| 4,274,293 | 6/1981 | Ruger | 248/429 X |
| 4,448,381 | 5/1984 | Anspaugh et al. | 248/429 X |
| 4,802,374 | 2/1989 | Hamelin et al. | 248/429 X |
| 4,838,511 | 6/1989 | Terada et al. | 248/429 |
| 4,939,945 | 7/1990 | Ryder et al. | 74/DIG. 10 X |
| 5,014,958 | 5/1991 | Harvey | 248/429 X |
| 5,144,849 | 9/1992 | Aihara et al. | 248/429 X |
| 5,150,872 | 9/1992 | Isomura | 74/89.14 X |

FOREIGN PATENT DOCUMENTS

| | | | |
|---|---|---|---|
| 2806998 | 8/1979 | Fed. Rep. of Germany | 248/429 |
| 2193629 | 2/1988 | United Kingdom | 248/429 |

Primary Examiner—David A. Scherbel
Assistant Examiner—Derek J. Berger
Attorney, Agent, or Firm—Robert P. Seitter; J. Gordon Lewis

[57] ABSTRACT

A strap is coupled between the sliding upper track of a power seat adjuster and the lead screw of a horizontal drive to transmit forces acting on the upper track which move the upper track in a forward direction to the lead screw bypassing the horizontal drive gears. The horizontal drive gears coupling the horizontal drive motor output shaft to the lead screw and the gear housing surrounding the drive gears are formed of a plastic material. In one embodiment, the strap has first and second ends with the first end loosely surrounding the lead screw. The second end of the strap is coupled in a force transmitting path with the upper track. An intermediate portion of the strap between the first and second ends is formed in a predetermined contour to deform under tension toward a planar shape and is disposed bypassingly around the drive gears.

17 Claims, 5 Drawing Sheets

POWER SEAT ADJUSTER WITH DRIVE GEAR FORCE BYPASS

BACKGROUND OF THE INVENTION

1. Field of the Invention

The present invention relates, in general, to seats, and, more specifically, to power seat adjusters for automobile seats.

Powered seat adjusters are a popular option on many automotive vehicles and are frequently offered as standard equipment on higher priced vehicles. Such power seat adjusters are primarily used on the driver's seat and, sometimes, on the front passenger seat of the vehicle.

Such power seat adjusters carry an upper support frame which supports the seat bottom and sometimes the seat back of the vehicle seat. The upper support frame is mounted on first and second, spaced track assemblies, each formed of an upper track which is connected to the upper support frame and which is slidably mounted in a lower track anchored to the vehicle floor. A drive mechanism, typically formed of a bi-directional electric motor mounted on the power seat adjuster which rotates a pair of drive shafts extending outward from the motor to a gear assembly or box mounted in each upper track. In one arrangement, the gear box rotates a lead screw extending below each upper track. A drive block mounted to the lower track threadingly receives the lead screw to cause reciprocal movement of the upper track and the attached upper support frame upon selective energization of the drive motor. Other drive mechanisms may also be incorporated into the power seat adjuster to provide vertical movement of the seat frame as well as pivotal movement of the seat back with respect to the seat bottom.

Although such power seat adjusters provide easy fore and aft movement of the seat in the lower tracks, it is imperative that the seat remain in a fixed, stationary position during a collision in order to prevent injury to the vehicle passenger using the seat. As a result, the weight and size of the power seat adjuster components are selected to provide a maximum amount of strength to resist any movement under the high impact forces transmitted to the seat from occupant and seat weight inertial loads and, sometimes, through the seat belt during a vehicle collision. Thus, the individual tracks, the torsion tubes or bars typically extending between and interconnecting the spaced upper tracks into a rigid structure and the other components of the power seat adjuster are made with stronger materials and greater thicknesses and dimensions to provide the requisite amount of strength. Although this adds weight and cost to the seat, such efforts have been considered essential to provide adequate strength to the seat to resist movement of the seat during a vehicle collision.

The horizontal drive mechanism employed to reciprocally move each upper track within a lower track typically includes a gear box attached to the upper track and coupled to the output shaft of the horizontal drive motor to transmit rotation of the output shaft of the drive motor to rotation of the lead screw which, through threading interaction with the drive block attached to the lower track, results in a sliding movement of the upper track with respect to the associated lower track. In order to provide adequate strength, the gear box has been formed of large zinc die castings. Such a construction has been considered necessary to provide adequate strength to the power seat adjuster to resist movement or deformation of the gear box during high impact loads, such as occur during a vehicle collision. However, such castings are costly and heavy. Further, the metal-to-metal contact of the gears generates undesirable noise and can create vibrations which are transmitted through the metal components of the power seat adjuster directly to the user of the seat.

In low and high impact load force conditions, such as those occurring during low speed and high speed vehicle collisions, forces exerted through the user's seat belt buckle onto the seat belt buckle bracket attached to a rear end of the upper track are transmitted to the upper track which tends to urge the upper track forward toward the front of the vehicle. These forces or loads are transmitted along the upper track to the gear box housing mounted to the upper track and thence to the heavy zinc die cast gear housing. The gears transmit the load or force to the attached lead screw such that the force is transmitted along the lead screw through the drive block to the lower track which is anchored to the vehicle floor. This structure provides a high level of strength which substantially resists any forward movement of the seat during low and high force impact conditions.

However, such high strength is achieved with several disadvantages. The large zinc die cast gear housing is heavy and costly. Further, the metal-to-metal contact between the gears creates noise and vibrations which are transmitted through the metal components of the gears and the seat to the user.

Thus, it would be desirable to provide a power seat adjuster which has a lighter weight and lower cost than previously devised power seat adjusters while still retaining sufficient strength to resist movement of the power seat adjuster during impact loads occurring during a vehicle collision. It would also be desirable to provide a power seat adjuster in which the horizontal drive gears require no lubrication. It would also be desirable to provide a power seat adjuster having a simplified horizontal drive gear design. Finally, it would be desirable to provide a power seat adjuster with an improved gear box arrangement which minimizes noise and vibrations generated by the horizontal drive gears.

SUMMARY OF THE INVENTION

The present invention is a power seat adjuster for use on a vehicle seat which has drive gear force transmission bypass means such that impact forces exerted on the power seat adjuster during a vehicle collision bypass the horizontal drive gears which reciprocatingly move the upper track within the lower track, while still being transmitted through the lead screw and drive block to the lower track which is anchored to the vehicle floor.

The power seat adjuster includes first and second spaced track assemblies. Each of the first and second track assemblies is formed of a lower track anchored to the vehicle floor and an upper track slidably disposed within the lower track. At least one and preferably two torsion tubes extend between and are connected to opposite ends of each of the upper tracks in the first and second track assemblies. A horizontal drive motor having first and second rotatable output shafts is mounted between the first and second track assemblies, with the first and second output shafts extending toward each of the upper tracks in the first and second track assemblies.

A lead screw is disposed between each upper and lower track and threadingly engages a drive block fixedly mounted to each lower track. Gear means fixedly mounted to each upper track couple one of the motor output shafts to one of the lead screws and transmit rotation of the motor output shaft to rotation of each lead screw to thereby effect reciprocating movement of the upper track within the lower track depending upon the duration and direction of rotation of the drive motor output shafts.

The gear means preferably includes a plurality of meshingly engaged gears, at least certain of which are formed of plastic. In a preferred embodiment, all of the gears of the gear means and the housing surrounding the gear means and fixedly mounted to the upper track are formed of plastic.

Means are disposed in a force transmitting position between each upper track and each lead screw associated therewith for transmitting forces imparted on the upper track, which tend to urge the upper track in a forward direction, between the upper track and the lead screw around and bypassing the gear means.

In a preferred embodiment, the force transmitting means comprises a thin metallic strap which has first and second ends. The strap is formed with the first and second ends disposed in an overlapping, substantial registry position. Co-axial apertures are formed in each of the first and second ends of the strap and loosely surround the lead screw. An arcuate loop-shaped portion is formed in the strap between and spaced from the overlapping first and second ends of the strap. The arcuate, loop-shaped portion is disposed around the torsion tube connected to the upper track. The portion of the strap between the overlapped first and second ends and the arcuate, loop-shaped portion has a predetermined contour which deforms under tension toward a substantially planar shape as forces imparted on the upper track urge the upper track, the attached torsion tube and the arcuate, loop-shaped portion of the strap in a forward direction and the first and second ends of the strap remain substantially stationary in contact with the gear means to transmit such forces bypassingly around the gear means and the gear housing to the lead screw and thence through the drive block and the lower track to the vehicle floor.

In a preferred embodiment, a metallic washer is welded about one end of each lead screw. A worm gear is insert molded about the one end of the lead screw and the washer and inserted into the gear housing. A worm is also rotatably mounted within the gear housing in meshing engagement with the worm gear. One of the motor output shafts fixedly engages the worm to rotate the worm, and thereby, through the worm gear, the lead screw.

The use of the force transmitting means of the present invention enables lightweight and low cost plastic gears to be employed as the gear means coupling the horizontal drive motor output shaft to the lead screw while, at the same, time providing a force bypass path around the plastic gears to transmit load forces imparted on the upper track, which would fracture or render the gears inoperable, around the gears and the gear housing.

The plastic gear housings reduce noise and vibrations as compared to the metal housings employed in previous power seat adjusters and isolate any noise and vibration generated therein from the rest of the power seat adjuster and the seat mounted thereon. The use of plastic gear housings also is lower in cost than the heavy, large cross section, zinc die cast housings employed in previous power seat adjuster drive gear mechanisms.

Finally, by shaping the contour of the force transmitting means, such as by providing angular bends in the strap between the first and second ends and the arcuate, loop-shaped opposite end portion, it is possible to provide a predetermined, predictable elongation characteristic to the force transmission means or strap which offers the potential for absorption of a portion of the forces exerted on the upper track during a vehicle collision.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
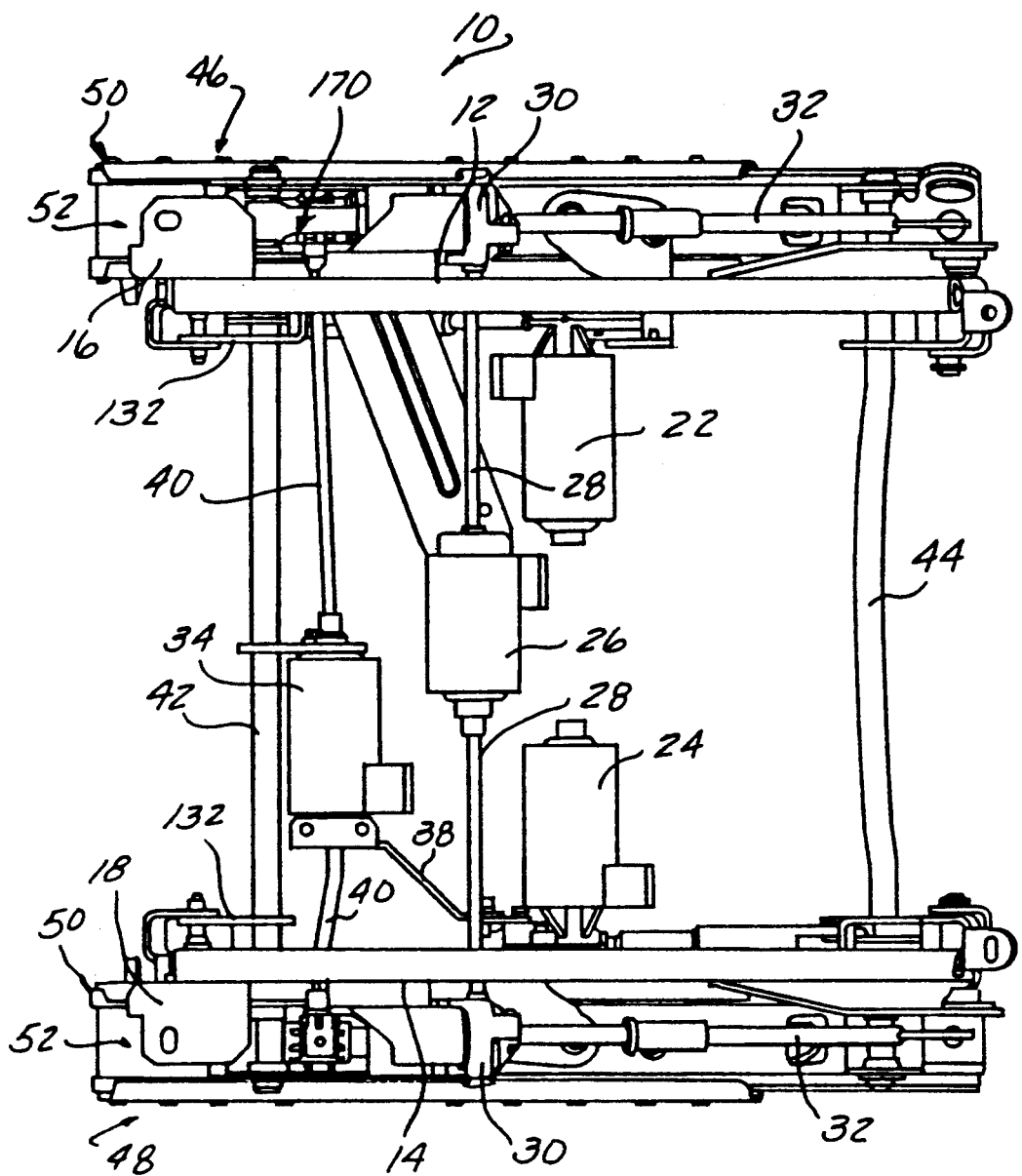
FIG. 1 is a plan view of a power seat adjuster incorporating the one-piece upper track of the present invention.
Figure 2:
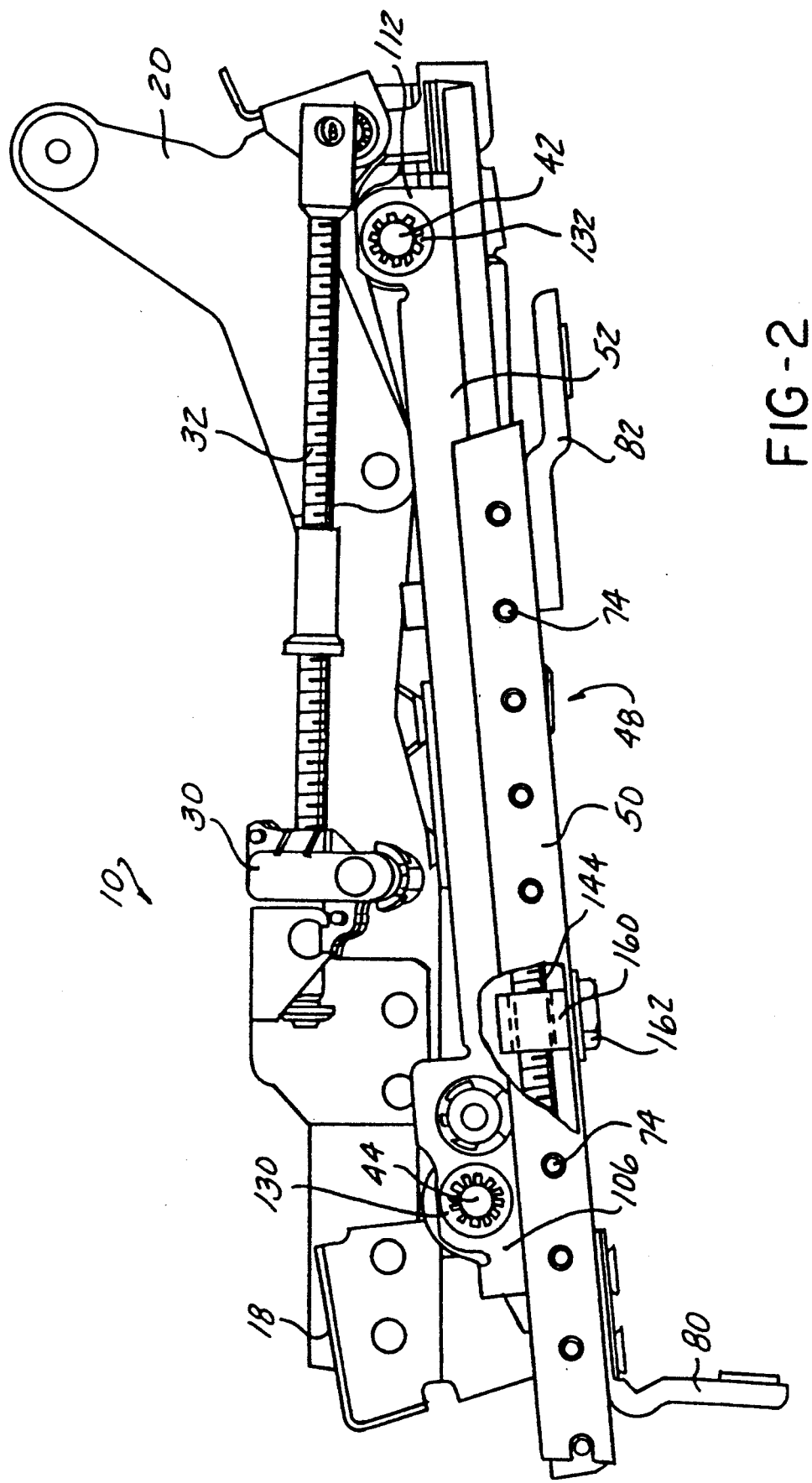
FIG. 2 is a side elevational view of the power seat adjuster shown in FIG. 1.

Referring now to the drawing, and to FIGS. 1 and 2 in particular, there is illustrated a power seat adjuster 10 which variably positions an automotive vehicle seat in any user selected position. The power seat adjuster 10 is a so-called "eight-way" adjuster providing horizontal fore/aft, vertical up and down movement of separate front and rear portions of the adjuster as well as pivotal tilting of the seat back with respect to the seat bottom. It will be understood, however, that the present invention described hereafter is employable with a power seat adjuster which includes at least a horizontal fore-/aft movement and any number of other movements.

As is conventional, the power seat adjuster 10 supports a conventional vehicle seat, not shown, which includes a seat bottom and a seat back. An upper support frame is provided on the power seat adjuster 10 for supporting and connecting the seat bottom and seat back to the power seat adjuster 10. The upper support frame includes a pair of spaced, longitudinally extending frame members or rails 12 and 14. Mounting brackets 16 and 18, for example, are mounted on the ends of the frame members 12 and 14, respectively, and provide a mounting surface for connecting the seat bottom to the upper support frame. A pair of hinge plates 20 are also mounted on the upper support frame and provide a pivot connection between the seat back and seat bottom to permit selective tilting or pivotal movement of the seat back with respect to the seat bottom as is typical in so-called "seat recliners".

Various drive assemblies are mounted on the power seat adjuster 10 to provide selective movement of the power seat adjuster 10 along various axes. For example, front and rear vertical drive motors 22 and 24, respectively, are mounted on the power seat adjuster 10 and connected to conventional lead screws and drive blocks or nuts to move front and rear portions of the vehicle seat to provide selective vertical adjustment of the front and rear portions of the vehicle seat. In addition, a recliner drive motor 26 is interconnected by a pair of rotatable drive shafts to gear boxes 30 which are each coupled to a lead screw 32. The lead screws 32 are connected to one of the pivotal seat back hinge plates 20 mounted on opposite sides of the power seat adjuster 10 to provide selective pivotal adjustment of the seat back with respect to the seat bottom.

More relevant to the present invention is a horizontal drive means formed of a bi-directional electric motor 34 which is fixedly mounted to one of the lower tracks 50 by means of a suitable bracket 38. A pair of rotatable output shafts 40 extend outward from the horizontal drive motor 34 to a rotatable connection with a lead screw by a gear means mounted in opposed track assemblies as described hereafter. The output shafts 40 are, in an exemplary embodiment, flexible steel shafts covered by a polyurethane sleeve.

The power seat adjuster 10 also includes a pair of tubular torsion tubes or members 42 and 44 which extend between and are connected to the opposed track assemblies 46 and 48 and provide a rigid support structure for the power seat adjuster 10. As each of the track assemblies 46 and 48 is identically constructed, the following description will refer to only one track assembly 48. It will be understood that the opposite track assembly 46 is constructed in the same manner.

Figure 3:
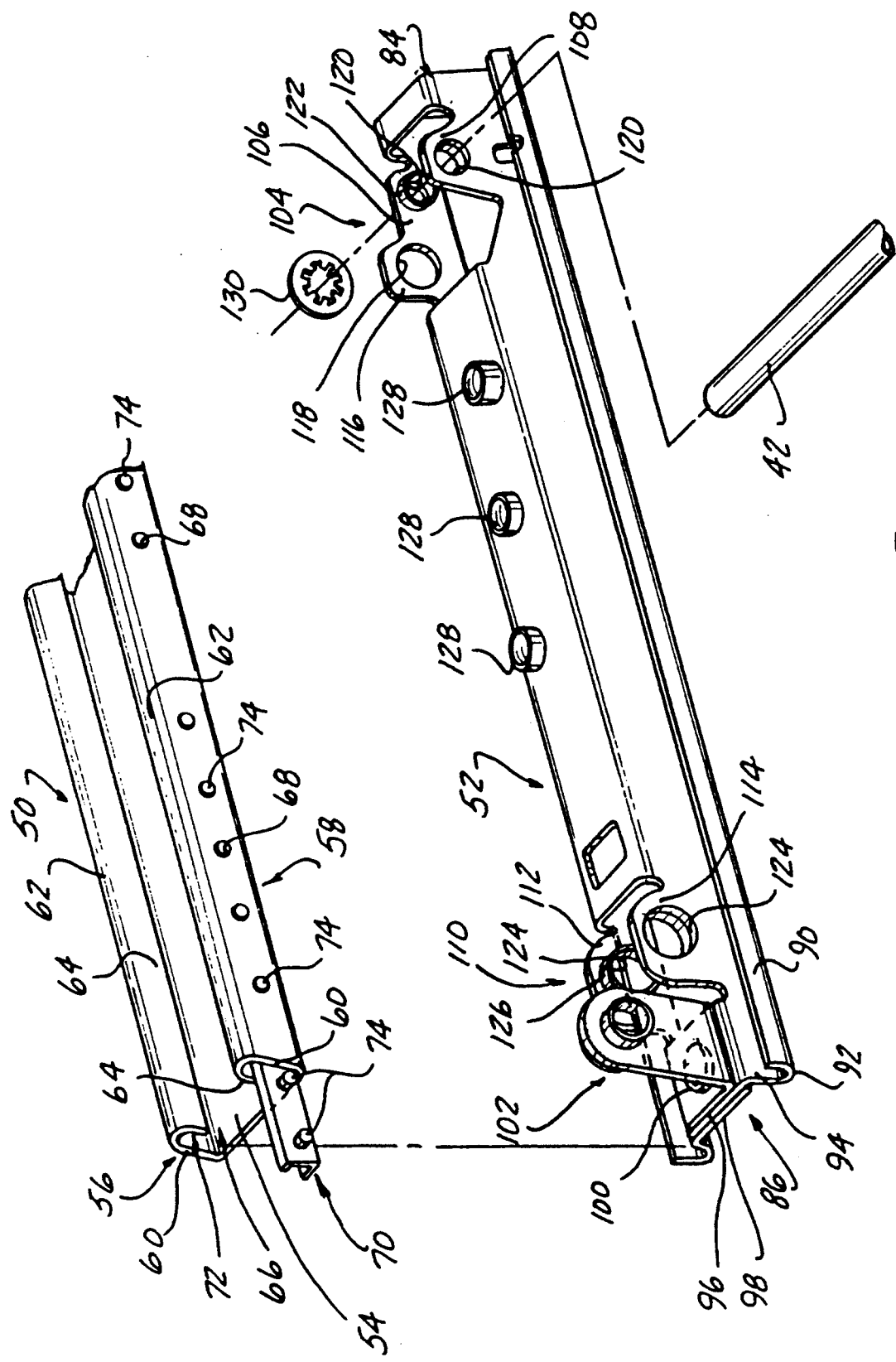
FIG. 3 is an exploded, perspective view showing the construction and mounting of the upper track of the present invention in a lower track.
Figure 4:
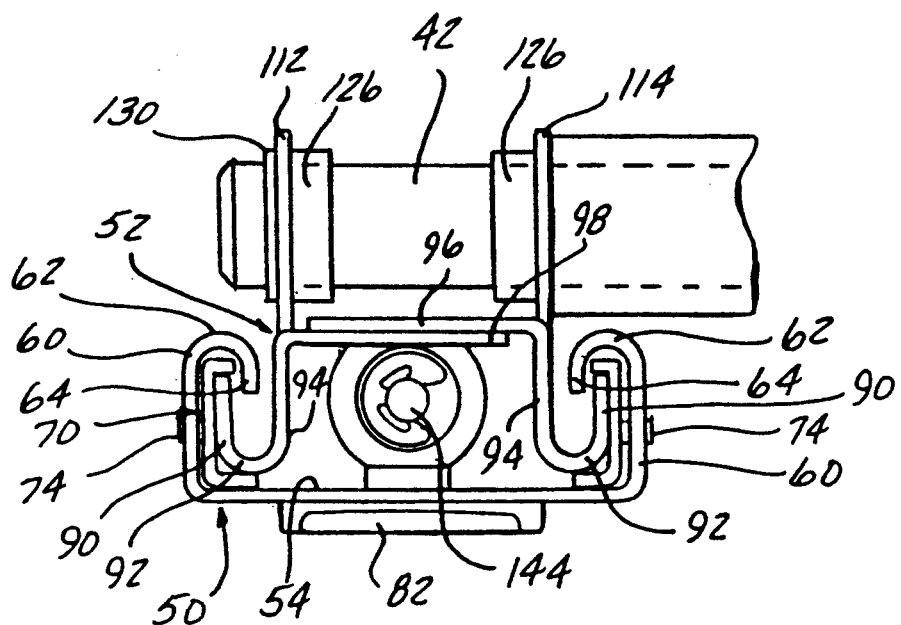
FIG. 4 is a left end view of the assembled upper and lower tracks shown in FIG. 3.

Referring now to FIGS. 1 and 2, and in detail to FIGS. 3 and 4, the track assembly 48 includes a lower track 50 and an upper track 52 which is slidably disposed within the lower track 50 and reciprocatingly movable bi-directionally along the lower track 50 under the control of the horizontal drive means. The lower track 50 is formed of an integral, one-piece member having a substantially planar central wall or web 54 and a pair of identically formed side walls 56 and 58 extending from opposite sides of the central wall 54. Each of the side walls 56 and 58 includes a vertically extending, outer side wall 60, a top wall 62 and an inward disposed lip or wall 64 which extends substantially vertically downward from the top wall 62 and is spaced from the outer side wall 60. The outer side wall 60, the top wall 62 and the inner wall 64 are formed in an inverted J-shape creating and surrounding a longitudinal extending channel 72. The lower edge of the inner wall 64 is spaced from the central wall 54 of the lower track 50 to define a longitudinally extending slot therebetween as denoted by reference number 66.

A plurality of spaced apertures 68 are formed in the outer side walls 60 of each side wall 56 and 58. A slide member 70, only one of which is shown in FIG. 3, is mounted in each channel 72 formed by the spaced portions of the central wall 54, the outer side wall 60, the top wall 62 and the inner wall 64 on opposite sides of the lower track 50. The slide 70 is substantially C-shaped and is complimentary to the shape of the channel 72. The sleeve 70 is formed of a suitable plastic material to provide a smooth sliding surface for the upper track 52, described hereafter, which is slidingly disposed within the slide 70. A plurality of outwardly extending pins 74 are formed on and extend outward from a side wall of the slide 70 and engage the apertures 68 in the outer side wall 60 of the corresponding side walls 56 and 58 of the lower track 50 to securely and stationarily position the slide 70 within the lower track 50.

As shown in FIG. 2, a front riser 80 and a rear riser 82 are attached to the lower track 50 at opposite ends thereof and provide a mounting connection to the vehicle floor by means of bolts or other suitable fasteners or anchors.

As shown in detail in FIG. 3, the upper track 52 is in the form of an elongated, one-piece, integrally formed member which is stamped, extruded, or otherwise formed from a suitable material, such as a high-strength, low alloy steel.

All of the various portions described hereafter which form a part of the upper track 52 are integrally formed with the entire upper track 52 and form an integral, continuous, unbroken, non-separate, part of the complete upper track 52. The upper track 52 includes a first end 84 and an opposed second end 86. A raised central portion or surface 88 extends between the first and second ends 84 and 86. The side walls of the upper track 52 are formed in a channel-like configuration complimentary to the shape of the channels 72 in the lower track 50 so as to enable the upper track 52 to be slidably disposed within the lower track 50 in sliding contact with the sleeves 70. Thus, each side wall of the upper track 88 is formed with a substantially J-shaped channel configuration formed of an outer side wall 90, a lower bottom wall 92 and an inner side wall 94 which extends to the central raised portion 88. The same channel-like configuration is also provided for the opposite longitudinal side wall of the upper track 52.

During the formation of the upper track 52, which is preferably by a stamping operation, a pair of overlapping flanges 96 and 98 are formed at the second end 86 of the upper track 52. Aligned apertures 100 are formed in each of the flanges 96 and 98 and provide a mounting point for the attachment of a seat belt buckle bracket 102 to the second end 86 of the upper track 52. The seat belt buckle bracket 102 provides an attachment point for a conventional seat belt buckle, not shown.

A first pair 104 of mounting flanges including spaced mounting flanges 106 and 108 are integrally formed in the upper track 52 adjacent the first end 84 thereof. A second pair 110 of mounting flanges including first and second mounting flanges 112 and 114 are integrally formed in the upper track 52 adjacent the overlapped flanges 96 and 98 at the second end 86 of the upper track 52. Each of the pairs 104 and 110 of mounting flanges is cut, such as by stamping, from the same material sheet used to form the entire one-piece upper track 52. After piercing, each pair of flanges 104 and 110 are then bent outwardly from the raised central portion 88 of the upper track 52 so as to be disposed in a substantially vertically extending position when the upper track 52 is mounted in its operating position in the power seat adjuster 10. Each of the mounting flanges 106, 108, 112 and 114 forming the first and second pair of mounting flanges 104 and 110 is substantially identically constructed with the exception of the mounting flange 106 which has an elongated end portion 116. An enlarged aperture 118 is formed in the end portion 116 to enable the drive shaft 40 of the horizontal drive motor 34 to pass therethrough to its connection to the horizontal gear means, as described hereafter.

A pair of co-axial aligned apertures 120 are formed in the mounting flanges 106 and 108 of the first pair of mounting flanges 104. The apertures 120 are preferably formed by an extrusion process which creates an inwardly extending, annular collar 122 extending toward the opposed mounting flange 106 or 108. The aligned apertures 120 provide a mounting connection for the tubular torsion tube 42 to the upper track 52 as described hereafter.

Similar coaxial apertures 124 are formed in the mounting flanges 112 and 114 of the second pair of mounting flanges 110 and are each formed with inwardly facing annular collars 126. The mounting apertures 124 provide a mounting connection for the other tubular torsion tube 44 as described hereafter.

Additionally, a plurality of longitudinally spaced apertures, each having an outwardly extending, annular collar 128 are formed on the raised central portion 88 of the upper track 50 and provide a mounting connection for a bracket used to attach the vertical drive motors 22 or 24 to each upper track 52.

As shown in FIG. 4, each torsion tube, such as torsion tube 42, extends through the aligned apertures in the mounting flanges 112 and 114 and the annular collars 126 associated therewith to connect the torsion tube 42 to the upper track 52. A fastener 130, such as a conventional push nut, is mounted on the outer end of the torsion tube 42 to securely attach the torsion tube 42 to the mounting flange 112. Referring briefly to FIG. 1, each torsion tube, such as torsion tube 42 is welded to a drive link 132 which is attached to the upper support 16 and spaced from the side wall of the upper track 52.

Figure 6:
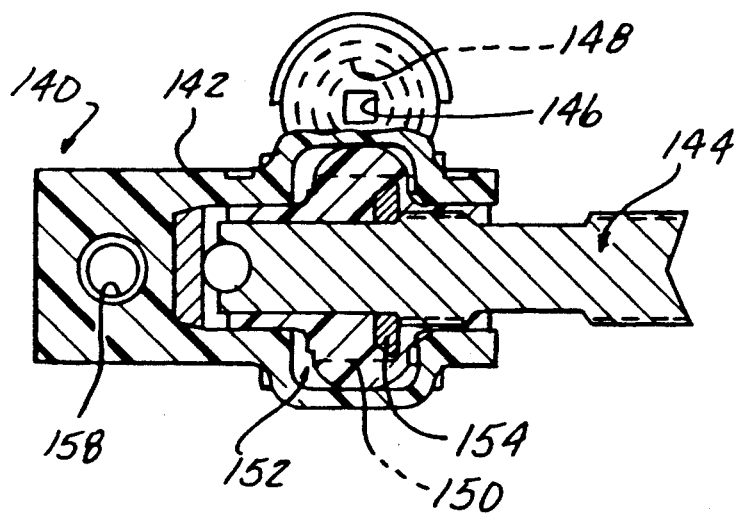
FIG. 6 is an enlarged, cross sectional view showing the gear means of the horizontal drive mechanism of the power seat adjuster.
Figure 5:
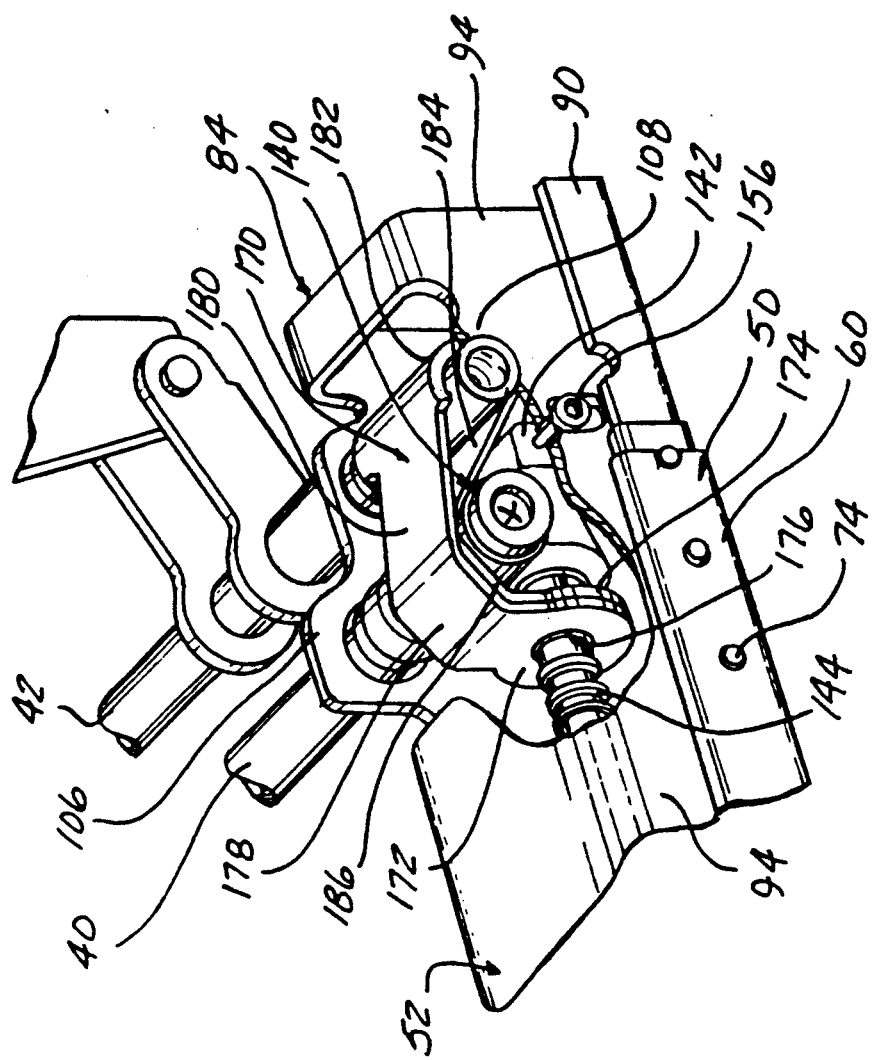
FIG. 5 is an enlarged, partial, perspective view showing a force transmitting catcher bracket according to another embodiment of the present invention.

Referring now to FIGS. 5 and 6, there is depicted a detailed illustration of a portion of the horizontal drive means which moves the upper track 52 in either direction along the lower track 50. A gear means or box denoted generally by reference number 140 is mounted beneath the central raised portion 88 of the upper track 52 adjacent the first end 84 of the upper track 52. The gear box 140 includes a lightweight plastic housing 142 which surrounds internal gears which translate rotation of the horizontal drive motor drive shaft 40 to rotation of the perpendicularly oriented horizontal lead screw 144. By way of example only, a worm 148 and a worm gear 152 are mounted within the housing 142 of the gear box 140. A substantially square slot 146 is formed in the worm 148 and receives one end of the horizontal drive motor output shaft 40. The worm 148 meshingly engages a helix thread 150 formed on the worm gear 152 mounted on one end of the lead screw 144. The worm gear 152 is preferably insert molded about a knurled end portion of the lead screw 144 as shown in FIG. 6. A metallic washer 154 is welded to the end portion of the lead screw 144 within the worm gear 152 to provide additional strength to the gear box 140, for reasons which will become more apparent hereafter. The worm 148 and the worm gear 152 are preferably formed of a high strength plastic, such as DELRIN or NYLON.

A mounting pin 156 shown in FIG. 5 extends through a bore 158 in the housing 142 and engages opposed side walls 94 of the upper track 52 to mount the gear box 140 to the upper track 52.

As shown in FIG. 2, the lead screw 144 threadingly engages a drive block 160 which is stationarily mounted to the lower track 50 by means of a screw or other fastener 162. In this manner, rotation of the lead screw 144 in either direction will result in a linear movement of the upper track 52 with respect to the stationarily positioned lower track 50 through the coupling between the lead screw 144 and the drive block 160.

Referring again to FIG. 5, in another embodiment of the present invention, means are provided for bypassing the gear box 140 and transmitting forces imposed on the upper track 52 around the gear box 140 to the lower track 50. The force transmitting bypass means 170 preferably is in the form of a catcher strap or bracket which may have any suitable shape besides that illustrated in FIG. 5 and described hereafter. The shape of the catcher strap 170 may be varied to provide a predetermined force versus load compliance characteristic such that the catcher strap 170 exhibits controlled elongation under force loading. The catcher strap 170 is preferably in the form of a thin, planar strip formed to the desired shape. The strap 170 is also, preferably, formed of a mild steel.

By way of example only, the catcher strap 170, as shown in FIG. 5, is formed of an integral, one-piece member having first and second ends 172 and 174 bent or formed into an overlapping position substantially in registry with each other. Each of the first and second ends 172 and 174 is identically constructed and has an enlarged, substantially annular shape with a centrally located aperture 176 formed therein. A substantially planar, angularly disposed bent portion 178 extends continuously from the first end portion 172 to a horizontally oriented planar portion 180. The catcher strap 170 loops in an arcuate, loop-shaped portion 182 about the torsion tube 42 extending through the first end 84 of the upper track 52. The arcuate, loop-shaped portion 182 may or may not be in contact with the torsion tube 42. Extending from the arcuate, loop-shaped portion 182 is a second substantially linear portion 184 which merges into an angularly disposed, substantially planar portion 186 disposed adjacent to the angular portion 178. The angular portion 186 merges integrally into the enlarged second end portion 174.

In normal operation of the power seat adjuster 10, the catcher strap 170 merely rests in an inoperative position around the torsion tube 42 and over the gear box housing 142. The enlarged first and second end portions 172 and 174 surround the lead screw 144, with the lead screw 144 extending through the apertures 176 in the first and second ends 172 and 174 of the catcher strap 170 without impediment.

It will be noted that a similar catcher strap 170 could be mounted on the opposite track assembly of the power seat adjuster 10 if a second seat belt buckle mount is desired on the opposite track assembly.

In low load situations, such as those resulting from low or slow speed collisions of the vehicle having the power seat adjuster 10 mounted therein, the bypass means or catcher strap 170 on each track assembly remains in a substantially inoperative condition. During such low load situations, a force will be imparted by the seat belt buckle to the seat belt buckle attachment bracket 102 mounted at the second end 86 of the upper track 52 of one of the track assemblies. This load is then transferred through the seat belt buckle bracket 102 to the upper track 52 and then along the upper track 52 to the gear box housing 142 by the mounting pin 156 attached to the upper track 52. Although the gear box housing 142 is formed of a plastic material, under low load conditions, the gear box housing 142 will remain intact and thereby transmit the load through the worm gear 152 mounted therein to the lead screw 144. From the lead screw 144, the load is transferred through the drive block 160 to the lower track 50 which is securely anchored to the vehicle floor by means of the front and rear risers 80 and 82.

The force transmitting bypass 170 means comes into operation during high load conditions which occur during high speed vehicle collisions. During such high load conditions, the loading is initially the same as that described above in that a force or load will be imparted through the seat belt buckle attachment bracket 102 to the upper track 52. The load is then transferred from the upper track 52 through the mounting pin 156 to the gear box housing 142. However, the high force or load will exceed the strength of the gear box housing 142 thereby fracturing the gear box housing 142. At the same time, during such high load conditions, the upper track 52 is moved forward toward the front of the vehicle which imparts an elongation or tension load on the catcher strap 170. This brings the angular portions 178 and 186 of the catcher strap 170 into contact with the upper portion of the gear box housing 142 thereby causing an elongation of the catcher strap 170 and a controlled straightening of the angular portions 178 and 186 of the catcher strap 170.

Even though the gear box housing 142 is fractured and unable to transmit the load therethrough, the washer 154 which is welded to the end of the lead screw 144 and insert molded within the worm gear 152 remains intact and transfers the load imparted by the first ends 172 and 174 of the catcher strap 170 to the lead screw 144 where it is again transmitted through the drive block 160 to the lower track 50 which is securely anchored to the vehicle floor. In this manner, the forces imparted on the power seat adjuster 10 during low and high speed collisions are effectively transmitted through the various components of the power seat adjuster 10 to the vehicle floor to prevent any undesirable movement of the power seat adjuster 10 and the seat attached thereto during a collision. In the particular situation of a high speed collision which generates high impact forces on the power seat adjuster 10, the catcher strap 170 provides a force transmitting bypass path around the plastic gear box housing 142 which will fracture at a certain load and still enable the load to be transferred through the lead screw 144 and drive block 160 to the lower track 50 anchored to the vehicle floor.

The unique provision of the force transmitting bypass means or catcher strap 170 enables low cost and lightweight plastic gear components to be employed for the first time in a power seat adjuster without any loss in effective strength of the power seat adjuster which would cause undesirable movement of the power seat adjuster during a high load condition. The use of plastic gears and gear housing eliminates the higher weight and more costly zinc die cast gear housing required in previously devised power seat adjusters. The catcher strap is simple in construction and low in cost and is easily mounted to the power seat adjuster without requiring any significant modification in the power seat adjuster drive components.

What is claimed is:

1. A power seat adjuster for a vehicle comprising:
   first and second spaced track assemblies, each formed of a lower track and an upper track slidably disposed within each lower track
   a drive motor having at least a first rotatable output shaft extending toward one of the first and second track assemblies;
   a lead screw disposed between one upper track and one lower track;
   a drive block fixedly mounted to the one lower track and threadingly engaging the lead screw;
   gear means fixedly mounted to the one upper track and coupling the one motor output shaft to the lead screw, the gear means including a plurality of meshingly engaged gears, at least certain of which gears are formed of a plastic material; and
   means force transmittingly coupled at one end to the one upper track and disposed at another end about the lead screw associated therewith and normally decouplingly spaced from the gear means, for transmitting forces imparted on the upper track and tending to move the upper track in a forward direction between the one upper track and the lead screw bypassing around the gear means.

2. The power seat adjuster of claim 1 wherein the gear means comprises:
   a housing attached to the upper track;
   a first gear rotatably mounted in the housing and connected to one of the first and second motor output shafts; and
   a second gear fixedly mounted on one end of the lead screw and disposed within the housing in meshing engagement with the first gear, the first and second gears transmitting rotation of the one of the first and second motor output shafts to rotation of the associated lead screw.

3. The power seat adjuster of claim 2 further comprising:
   a metallic disc mounted on one end of the lead screw, the second gear being insert molded about the metallic disc and the lead screw.

4. The power seat adjuster of claim 2 wherein the housing and the first and second gears are formed of a plastic material.

5. The power seat adjuster of claim 2 wherein the first gear is a worm and the second gear is a worm gear.

6. The power seat adjuster of claim 1 wherein:
   force transmission means are mounted on each of the first and second track assemblies.

7. A power seat adjuster for a vehicle comprising:
   first and second spaced track assemblies, each formed of a lower track and an upper track slidably disposed within each lower track;
   at least one tubular member connected between the upper tracks of each of the first and second track assemblies;
   a drive motor having at least a first rotatable output shaft extending toward one of the first and second track assemblies;
   a lead screw disposed between one upper track and one lower track of one of the first and second track assemblies;
   a drive block fixedly mounted to the one lower track and threadingly engaging the lead screw associated therewith;
   gear means fixedly mounted to the one upper track and coupling the one motor output shaft to the lead screw, the gear means including a plurality of meshingly engaged gears, at least certain of which gears are formed of a plastic material; and
   means, disposed in a force transmitting position between the one upper track and the lead screw associated therewith, for transmitting forces imparted on the upper track and tending to move the upper track in a forward direction between the upper track and the lead screw bypassing around the gear means the force transmitting means including:
   a one-piece strap having first and second ends, the first end disposed about the lead screw, the second end coupled in a force transmitting path with the upper track; and an intermediate portion of the strap between the first and second ends bypassingly disposed around the gear means and formed in a predetermined contour which deforms under tension toward a substantially planar shape.

8. The power seat adjuster of claim 7 wherein:

the contour of the portion of the strap between the overlapped first and second ends and the arcuate, loop-shaped portion is formed to have a predetermined, predictable elongation-force characteristic.

9. The power seat adjuster of claim 7 wherein the strap is a metallic strap.

10. The power seat adjuster of claim 7 wherein the gear means comprises:

a housing attached to the upper track;

a first gear rotatably mounted in the housing and connected to one of the first and second motor output shafts; and a second gear fixedly mounted on one end of the lead screw and disposed within the housing in meshing engagement with the first gear, the first and second gears transmitting rotation of the one of the first and second motor output shafts to rotation of the associated lead screw.

11. The power seat adjuster of claim 10 further comprising:

a metallic disc mounted on one end of the lead screw, the second gear being insert molded about the metallic disc and the lead screw.

12. The power seat adjuster of claim 10 wherein the housing and the first and second gears are formed of a plastic material.

13. The power seat adjuster of claim 10 wherein the first gear is a worm and the second gear is a worm gear.

14. The power seat adjuster of claim 7 further comprising:

the drive motor having first and second output shafts extending toward the first and second track assemblies, respectively;

a lead screw and a drive block mounted in each of the first and second track assemblies;

gear means coupling each of the first and second motor output shafts to a lead screw; and the force transmission means mounted on each of the first and second track assemblies.

15. A power seat adjuster for a vehicle comprising:

first and second spaced track assemblies, each formed of a lower track and an upper track slidably disposed within each lower track;

at least one tubular member connected between the upper tracks of each of the first and second track assemblies;

a drive motor having at least a first rotatable output shaft extending toward one of the first and second track assemblies;

a lead screw disposed between one upper track and one lower track of one of the first and second track assemblies;

a drive block fixedly mounted to the one lower track and threadingly engaging the lead screw associated therewith;

gear means fixedly mounted to the one upper track and coupling the first motor output shaft to the lead screw, the gear means including a plurality of meshingly engaged gears, at least certain of which gears are formed of a plastic material; and means, disposed in a force transmitting position between the one upper track and the lead screw associated therewith, for transmitting forces imparted on the upper track and tending to move the upper track in a forward direction between the upper track and the lead screw around and bypassing the gear means the force transmitting means including:

a one-piece metallic strap having first and second ends, the first and second ends disposed in overlapping, substantial registry and each having an aperture formed therein loosely disposed about the lead screw;

an arcuate, loop-shaped portion formed in the strap between and spaced from the overlapping first and second ends of the strap, the arcuate, loop-shaped portion disposed around the at least one tubular member connected to the upper track; and the portion of the strip between the overlapped first and second ends and the arcuate, loop-shaped portion having a predetermined contour which deforms under tension toward a substantial planar shape as forces imparted on the upper track urging the upper track, the attached at least one tubular member, and the arcuate, loop-shaped portion of the strap in a forward direction and the first and second ends of the strap remain substantially stationary in contact with the lead screw to transmit such forces bypassingly around the gear means to the lead screw.

16. The power seat adjuster of claim 15 wherein the portion of the strap between the arcuate, loop-shaped portion and the overlapped first and second ends has first and second angularly disposed sections.

17. A power seat adjuster for a vehicle comprising:

first and second spaced track assemblies, each formed of a lower track and an upper track slidably disposed within each lower track;

at least one tubular member connected between the upper tracks of each of the first and second track assemblies;

a drive motor having first and second rotatable output shafts, each extending toward one of the upper tracks;

a lead screw disposed between each upper and lower track;

a drive block fixedly mounted to each lower track and threadingly engaging the lead screw adjacent thereto;

gear means fixedly mounted to each upper track and coupling one of the first and second motor output shafts to one lead screw, the gear means including a housing attached to each upper track, a first gear rotatably mounted in the housing and connected to one of the first and second motor output shafts, and a second gear fixedly mounted on one end of one of the lead screws and disposed within the housing in meshing engagement with the first gear, the first and second gears transmitting rotation of the one of the first and second motor output shafts to rotation of the associated lead screw;

the housing, the first gear and the second gear formed of a plastic material;

a metallic disc mounted on one end of the lead screw, the second gear being insert molded about the metallic disc and the lead screw; and means, disposed in a force transmitting position between each upper track and each lead screw associated therewith, for transmitting forces imparted on the upper track and tending to move the upper track in a forward direction between the upper track and the lead screw bypassing around the gear means, the force transmitting means including:

a metallic strap having first and second ends, the first end loosely disposed about the lead screw, the second end coupled in a force transmitting path with the upper track; and an intermediate portion of the strap between the first and second ends disposed bypassingly around the gear means and formed in a predetermined contour which deforms under tension toward a substantially planar shape.

* * * * *